(12) United States Patent
Yano (10) Patent No.: US 10,054,850 B2
(45) Date of Patent: Aug. 21, 2018

(54) LIGHT SOURCE DEVICE AND PROJECTOR

(71) Applicant: Seiko Epson Corporation, Tokyo (JP)

(72) Inventor: Kunihiko Yano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/861,738

(22) Filed: Sep. 22, 2015

(65) Prior Publication Data

US 2016/0097514 A1    Apr. 7, 2016

(30) Foreign Application Priority Data

Oct. 6, 2014   (JP) .................................. 2014-205490

(51) Int. Cl.
| | |
|---|---|
| *F21V 9/06* | (2018.01) |
| *F21V 13/02* | (2006.01) |
| *F21V 9/16* | (2006.01) |
| *G03B 21/20* | (2006.01) |

(52) U.S. Cl.
CPC ............ *G03B 21/2093* (2013.01); *F21V 9/06* (2013.01); *F21V 13/02* (2013.01); *G03B 21/20* (2013.01); *G03B 21/2026* (2013.01)

(58) Field of Classification Search
CPC .......... F21V 9/06; F21V 13/02; G02B 5/283; G03B 21/20; G03B 21/2026; G03B 21/2093
See application file for complete search history.

(56) References Cited

U.S. PATENT DOCUMENTS

| | | | | |
|---|---|---|---|---|
| 2003/0189693 A1* | 10/2003 | Ishino | ................... | G03B 33/12 |
| | | | | 353/31 |
| 2004/0114114 A1* | 6/2004 | Yano | ..................... | G02B 5/283 |
| | | | | 353/84 |
| 2005/0012870 A1 | 1/2005 | Hirata et al. | | |
| 2005/0122721 A1* | 6/2005 | Hori | ..................... | H04N 9/3144 |
| | | | | 362/268 |
| 2005/0265027 A1* | 12/2005 | Wu | ......................... | F21V 9/04 |
| | | | | 362/293 |
| 2007/0058137 A1* | 3/2007 | Yang | ..................... | G03B 21/26 |
| | | | | 353/52 |

(Continued)

FOREIGN PATENT DOCUMENTS

| | | |
|---|---|---|
| JP | 10-161241 A | 6/1998 |
| JP | 2003-107242 A | 4/2003 |

(Continued)

*Primary Examiner* — Christina Riddle
*Assistant Examiner* — Christopher Lamb, II
(74) *Attorney, Agent, or Firm* — ALG Intellectual Property, LLC (57) ABSTRACT

A light source device includes a light source that emits light including light having a wavelength in the ultraviolet region, a first filter that removes light of a particular wavelength region of the ultraviolet region among light from the light source and that transmits light of another wavelength region, a second filter that is arranged on a side of the first filter opposite to that on which the light source is arranged, and that removes light of a wavelength region that is different from the particular wavelength region of the ultraviolet region among the light transmitted by the first filter, wherein the second filter has a half-value wavelength that is shorter than a half-value wavelength of the first filter.

6 Claims, 4 Drawing Sheets

(56) References Cited

U.S. PATENT DOCUMENTS

| | | | | |
|---|---|---|---|---|
| 2007/0206166 A1* | 9/2007 | Wu | ........................ | G02B 7/102 |
| | | | | 353/102 |
| 2007/0230157 A1* | 10/2007 | Nagarekawa | ............. | F21V 5/04 |
| | | | | 362/34 |
| 2008/0007698 A1* | 1/2008 | Gupta | ................ | G03B 21/2026 |
| | | | | 353/84 |
| 2009/0201578 A1* | 8/2009 | McClatchie | ........... | G02B 5/208 |
| | | | | 359/356 |
| 2012/0327380 A1* | 12/2012 | Iwabayashi | ............. | H01J 61/86 |
| | | | | 353/99 |

FOREIGN PATENT DOCUMENTS

| | | |
|---|---|---|
| JP | 2007-212733 A | 8/2007 |
| JP | 2009-145911 A | 7/2009 |

* cited by examiner

LIGHT SOURCE DEVICE AND PROJECTOR

BACKGROUND

1. Technical Field

The present invention relates to a light source device and a projector.

2. Related Art

In recent years, for example, the brightness of projectors has been increasing and the size of projectors has been decreasing annually, and a high output supervoltage mercury lamp that generates strong ultraviolet rays is being used as a light source in such projectors. Consequently, due to mainly ultraviolet light, degradation occurs in components composed of organic matter such as liquid crystal panels, polarizing plates, and wave plates and the like which are used for internal optical systems, and display quality becomes degraded in a short time.

In projectors, in order to protect components such as the liquid crystal panel from ultraviolet light generated by the light source, it is necessary to have an ultraviolet ray cut filter (herein below, called an ultraviolet cut filter) arranged in the light path between the light source and the liquid crystal panel. An example of such an ultraviolet cut filter is one constituted by a dielectric multilayer film formed by using a vacuum deposition method.

However, in the case where an ultraviolet cut filter formed of a dielectric multilayer film described above is used in a projector, it is necessary for the filter to have spectral characteristics that sufficiently cut ultraviolet rays while securing transmittance in the transmission band. In order to attain these spectral characteristics, it is necessary to stack, for example, 40 or more dielectric layers. However, in such a case, it is difficult to maintain necessary film thickness precision from the start to the end of the film formation of the dielectric film, and because of the deterioration of productivity as a result of the film formation time becoming extremely long, practical use is low.

In contrast, there is a known technology (for example, JP-A-2007-212733) in which an ultraviolet cut filter which can be formed by stable film formation (for example, a stacking layer number of 20 layers or less) and an ultraviolet cut filter of the ultraviolet absorption type are used in such a manner as to secure necessary spectral characteristics.

However, in ultraviolet cut filters, it is desirable for the cut-off characteristic that changes from the cut wavelength to the transmission wavelength to be steep. This is because, in the case where the cut-off characteristic is steep, the boundary between the cut wavelength and the transmission wavelength is distinct; therefore by transmitting light having only a particular wavelength component, such light is useable as image light.

If strong light is incident on an ultraviolet-absorption-type ultraviolet cut filter, there is a problem in that heat is generated and the transmittance near the cut wavelength does not have a steep characteristic. Consequently, it is conceivable to stack a plurality of ultraviolet cut filters each formed of a light-reflection-type dielectric multilayer film. However, there is a concern that, in the case where dielectric multilayer films are stacked in such a manner, because a sufficient cut-off characteristic (steepness) is not obtained, the boundary between the cut wavelength and the transmission wavelength is not distinct, and an image light including a component having a wavelength other than a certain wavelength is transmitted thereby causing a decrease in image quality.

SUMMARY

An advantage of some aspects of the invention is that a light source device and projector capable of displaying high-quality images while suppressing damage caused by ultraviolet rays are provided.

According to a first aspect of the embodiment, a light source device includes a light source that emits light including light having a wavelength in an ultraviolet region, a first filter that removes light of a particular wavelength region of the ultraviolet region among light from the light source and that transmits light of another wavelength region, and a second filter that is arranged on a side of the first filter opposite to that on which the light source is arranged and that removes light of a wavelength region that is different from the particular wavelength region of the ultraviolet region among the light transmitted by the first filter, wherein the second filter has a half-value wavelength that is shorter than a half-value wavelength of the first filter.

In the light source device according to the first aspect, as the first filter and the second filter, by adopting a combination of filters having slightly different half-value wavelengths, a cut-off characteristic that changes from a reflection wavelength to a transmission wavelength can be made steep, and therefore it is possible to obtain an ultraviolet cut function that can make a boundary between the reflection wavelength and the transmission wavelength distinct. Moreover, after cutting most of the ultraviolet component from light from the light source by the first filter that has a long cut wavelength, the second filter can further cut the remaining ultraviolet part in stages. Therefore, for example, among light from the light source, it is possible to cut a particular ultraviolet component that causes damage to optical modulators and the like. Therefore, for example, among light from the light source, it is possible to emit light having only a particular wavelength component while cutting an ultraviolet component that causes damage to optical modulators and the like.

In the first aspect of the embodiment, it is preferable that the half-value wavelength of the second filter be 3 nm to 20 nm shorter than the half-value wavelength of the first filter. In this way, by using the first filter and the second filter that have different cut wavelengths, it is possible to advantageously obtain an ultraviolet cut function in which the change from the reflection wavelength to the transmission wavelength is steep.

In the first aspect of the embodiment, it is preferable that the first filter and the second filter each be formed of a dielectric multilayer film made up of alternately stacked high-refractive-index layers and low-refractive-index layers. Further, it is preferable that the high-refractive-index layers each include $TiO_2$, $Ta_2O_5$, or $Nb_2O_5$, and that the low-refractive-index layers each include $SiO_2$ or $MgF_2$. By doing this, it is possible to obtain a desirable ultraviolet cut function because the first filter and the second filter each formed of a dielectric multilayer film are used.

In the first aspect of the embodiment, it is preferable that the light source device further include a lens member that is arranged between the first filter and the second filter and that has a curved surface that protrudes toward the light source side, wherein the first filter be arranged on the curved surface of the lens member. According to this configuration, light from the light source diverges when reflected by the first filter having a curved surface that follows the curved surface of the lens member. Therefore, because light is reflected in various directions, and because light directly incident on the light source can be suppressed, it is possible to suppress a rise in the temperature of the light source due to absorption of reflected light or a decrease in the lifetime of the light source due to deterioration or the like caused by ultraviolet ray absorption. Here, generally, in ultraviolet cut filters, there is a characteristic that a cut wavelength shifts to the short wavelength side when light rays are diagonally incident on the film surface. In this configuration, because the surface of a first ultraviolet cut filter at which light from the light source is incident has a curved shape, a part of the light from the light source is diagonally incident on the surface of the filter. The component diagonally incident on the first ultraviolet cut filter is not sufficiently cut by the first ultraviolet cut filter due to the wavelength thereof being shifted to the short wavelength side and is transmitted rearwards. At this point, by adopting the embodiment, it is possible to cut (reflect) the transmitted component that has been shifted to the short wavelength side by using the second ultraviolet cut filter that has a cut wavelength shorter than that of the first ultraviolet cut filter. Therefore, it is possible to suppress a decrease in the lifetime of the light source caused by reflected light (ultraviolet rays).

In the first aspect of the embodiment, it is preferable that the light source be an ultra-high-pressure mercury lamp. According to this configuration, it is possible to suppress damage caused by ultraviolet rays generated by the ultra-high-pressure mercury lamp.

According to a second aspect of the embodiment, a projector includes the light source device of the first aspect of the embodiment, an optical modulator that modulates light from the light source device in accordance with image information and emits light, and a projection optical system that projects light emitted from the optical modulator. Because the projector of the second aspect of the embodiment includes the above described light source device, it is a highly reliable projector capable of displaying a high-quality image while suppressing damage caused by ultraviolet rays.

BRIEF DESCRIPTION OF THE DRAWINGS

The invention will be described with reference to the accompanying drawings, wherein like numbers reference like elements.

DESCRIPTION OF EXEMPLARY EMBODIMENTS

A first embodiment of the invention will be described below with reference to the drawings. A projector of this embodiment is a three-plate liquid crystal projector including transmissive-liquid-crystal light valves of red (R), green (G), and blue (B), respectively. For clarity, some of the components in each of the following drawings may be illustrated by varying the scale of the dimensions of the components.

First Embodiment

Figure 1:
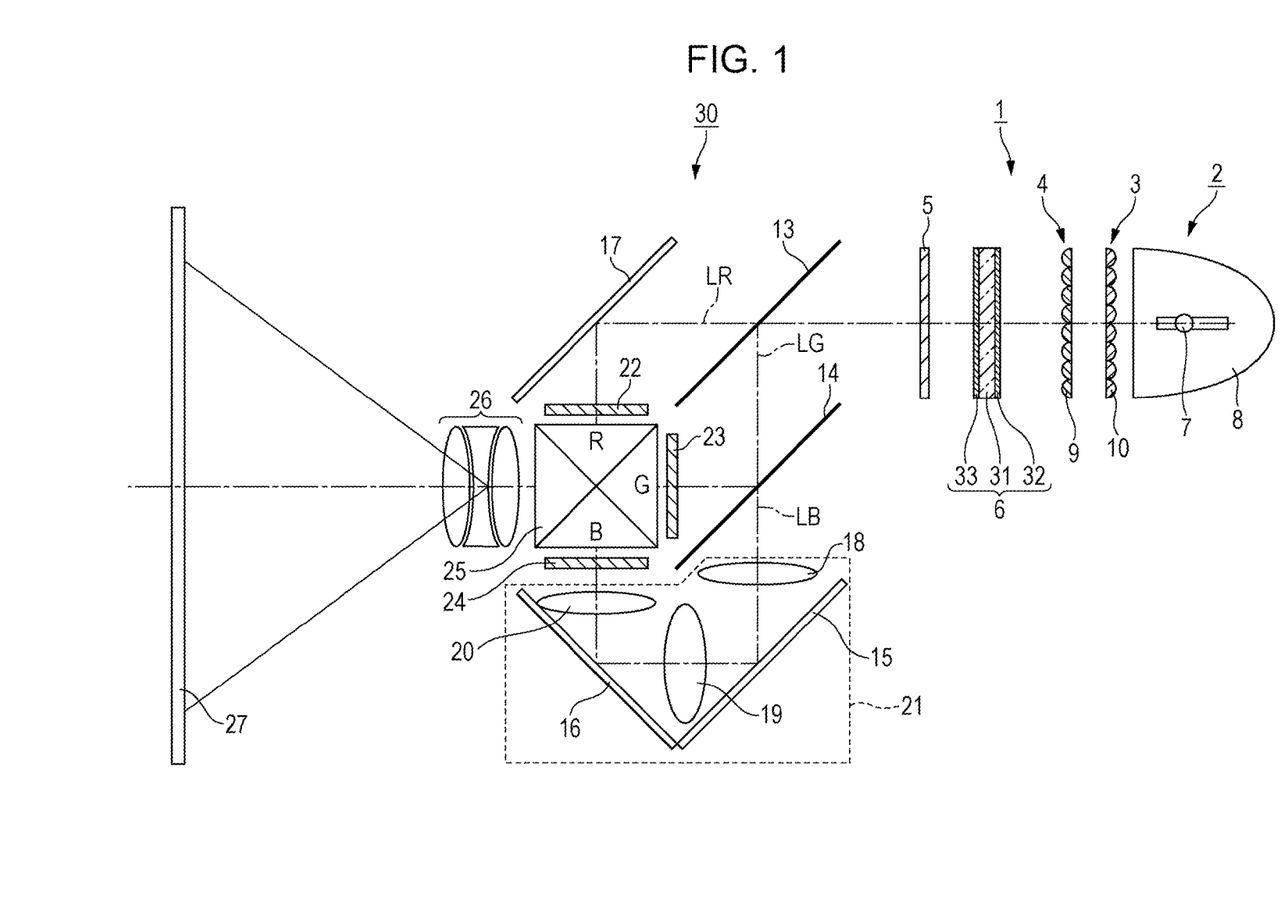
FIG. 1 is a schematic block diagram of a projector according to a first embodiment.

FIG. 1 is a schematic block diagram of a projector 30 of this embodiment. As shown in FIG. 1, the projector 30 of this embodiment includes a light source device 1, dichroic mirrors 13 and 14, reflecting mirrors 15, 16, and 17, liquid crystal light valves (optical modulators) 22, 23, and 24, a cross dichroic prism 25, and a projection lens (projection optical system) 26.

The light source device 1 includes a light source 2, a first fly-eye lens 3 and a second fly-eye lens 4 that constitute a uniform-illumination optical system, a polarization conversion element 5, and an ultraviolet cut member 6. The light source 2 is formed of a lamp 7 and a reflector 8 that reflects light of the lamp 7. As the lamp 7, for example, an ultra-high-pressure mercury lamp may be used. The ultra-high-pressure mercury lamp also functions as an ultraviolet light source, and includes a significantly large ultraviolet component (wavelength of 400 nm or less).

The first fly-eye lens 3 and the second fly-eye lens 4 are arranged in order from the side near the light source 2. The first fly-eye lens 3 is formed of a plurality of lenses 9. The second fly-eye lens 4 is formed of a plurality of lenses 10. The first fly-eye lens 3 and the second fly-eye lens 4 function as a uniform-illumination optical system that makes uniform the illumination distribution of light emitted from the light source 2 on an illumination region of the liquid crystal light valves 22, 23, and 24. Light emitted from the second fly-eye lens 4 is incident on the ultraviolet cut member 6.

Here, because light from the light source device 1 contains a large ultraviolet component as described above, in particular, there is a concern that the liquid crystal light valve 24, at which blue light containing an ultraviolet component is incident, may sustain considerable damage. Consequently, it is important to remove beforehand the ultraviolet component from light of the light source 2.

A generally used ultraviolet reflecting film for removing ultraviolet rays is formed of a dielectric multilayer film formed of alternately stacked high-refractive-index layers and low-refractive-index layers on a light transmissive substrate. As the material of the high-refractive-index layer, $TiO_2$ (n=2.4), $Ta_2O_5$ (n=2.1), $Nb_2O_5$ (n=2.2), or the like may be used, and as the material of the low-refractive-index layer, $SiO_2$ (n=1.46) or $MgF_2$ (n=1.38) may be used. The refractive index varies with wavelength, and the above-mentioned refractive indices n are for a wavelength of 500 nm.

The ultraviolet reflecting film includes repeating alternating layers of repeatedly stacked alternating high-refractive-index layers and low-refractive-index layers having the same optical film thickness. In the basic design of the film thickness, the repeated alternating layers are expressed as (0.5H, 1L, 0.5H) S. Here, the film thicknesses of the high-refractive-index layer (H) is denoted by H and that of the low-refractive-index layer (L) is similarly denoted by L, where 1H and 1L are equal to the respective values of the optical film thickness nd=¼λ and λ is a design wavelength near the center of a wavelength region that is desired to be cut. S represents the number of times the structure in parentheses is periodically repeated and is called the stack number. Actually, the number of layers that are stacked is 2S+1 layers, and by making the S value large, the cut-off characteristic (steepness) that changes from reflection to transmission can be made steep. A value in the range of about 3 to about 20 is selected as the S value.

For the projector 30 of this embodiment, it is necessary to have optical characteristics that reduce (reflect) ultraviolet light and light having a wavelength near 410 nm which easily damages the liquid crystal light valve 24, among the light of the light source 2, and that cause transmittance of light having a wavelength of 435 nm or more which is to be used as image light.

In order to obtain such optical characteristics it is necessary to have a light blocking performance that is capable of achieving a transmittance of light having, for example, a wavelength in the region to be cut of 0.1% or less (OD value of 3 or more), desirably 0.01% or less. To date, for example, it has been necessary to stack 40 or more dielectric layers in order to form an ultraviolet reflecting film that can obtain such a light blocking performance. However, it has been difficult, in practice, to stack 40 or more dielectric layers, because maintaining a desired film thickness precision from the start to the end of film formation of a dielectric film is extremely difficult and film formation time is very long and productivity is low.

To deal with this problem, the projector 30 of this embodiment uses the ultraviolet cut member 6 that is formed by combining two ultraviolet cut filters each made up of approximately 20 stacked dielectric layers that can be manufactured to a desired film thickness precision and that is capable of a light transmittance of 0.1% or less (desirably 0.01% or less) for a wavelength band that is to be cut.

The ultraviolet cut member 6 of this embodiment includes a substrate 31, a first filter 32 arranged on the light source 2 side of the substrate 31, and a second filter 33 arranged on the polarization conversion element 5 side of the substrate 31.

In this embodiment, the ultraviolet cut member 6 was disposed upstream of the polarization conversion element 5. However, the position where the ultraviolet cut member 6 is arranged is not limited to this. The ultraviolet cut member 6 may be arranged anywhere on the light path from the light source 2 to the liquid crystal light valve 24.

It is preferable that the substrate 31 be formed of a material that transmits visible light rays, and generally an inorganic glass is used, for example, soda-lime glass, borosilicate glass, lead glass, non-alkali glass, quartz glass, neo-Ceram, Corning Incorporated 7971 titanium silica glass, sapphire glass or the like may be used.

Regarding the ultraviolet cut member, other than the above described light blocking performance, it is also necessary that the cut-off characteristic that changes from the reflection wavelength to the transmission wavelength be steep. This is because, if the cut-off characteristic is steep, the boundary between the reflection wavelength and the transmission wavelength is distinct, and this makes it possible to extract light that contains only a certain wavelength component as image light.

The inventors of the present invention have found that, in the case where two ultraviolet cut filters having substantially the same light blocking performance and cut-off characteristic for a certain wavelength are combined with each other, although the light blocking performance increases with increasing number of dielectric layers, the cut-off characteristic decreases. Consequently, when the cut-off characteristic decreases as a result of combining ultraviolet cut filters that have substantially the same characteristics, the boundary between the reflection wavelength and the transmission wavelength is not distinct, and there is a concern that image quality might decrease due to the generation of image light containing a component other than one with a certain wavelength.

In contrast, in the ultraviolet cut member 6 of this embodiment, a combination of the first filter 32 and the second filter 33 having different optical characteristics has been adopted.

The cut wavelength of the first filter 32 is set to be longer than that of the second filter 33. Specifically, the first filter 32 is formed of an ultraviolet cut filter having a transmittance characteristic in which the cut-off half-value wavelength (a wavelength representing a transmittance of half the maximum transmittance of the first filter 32) is 433 nm. Moreover, the second filter 33 is formed of an ultraviolet cut filter having a transmittance characteristic in which the cut-off half-value wavelength (a wavelength representing a transmittance of half the maximum transmittance of the second filter 33) is 425 nm.

Figure 2:
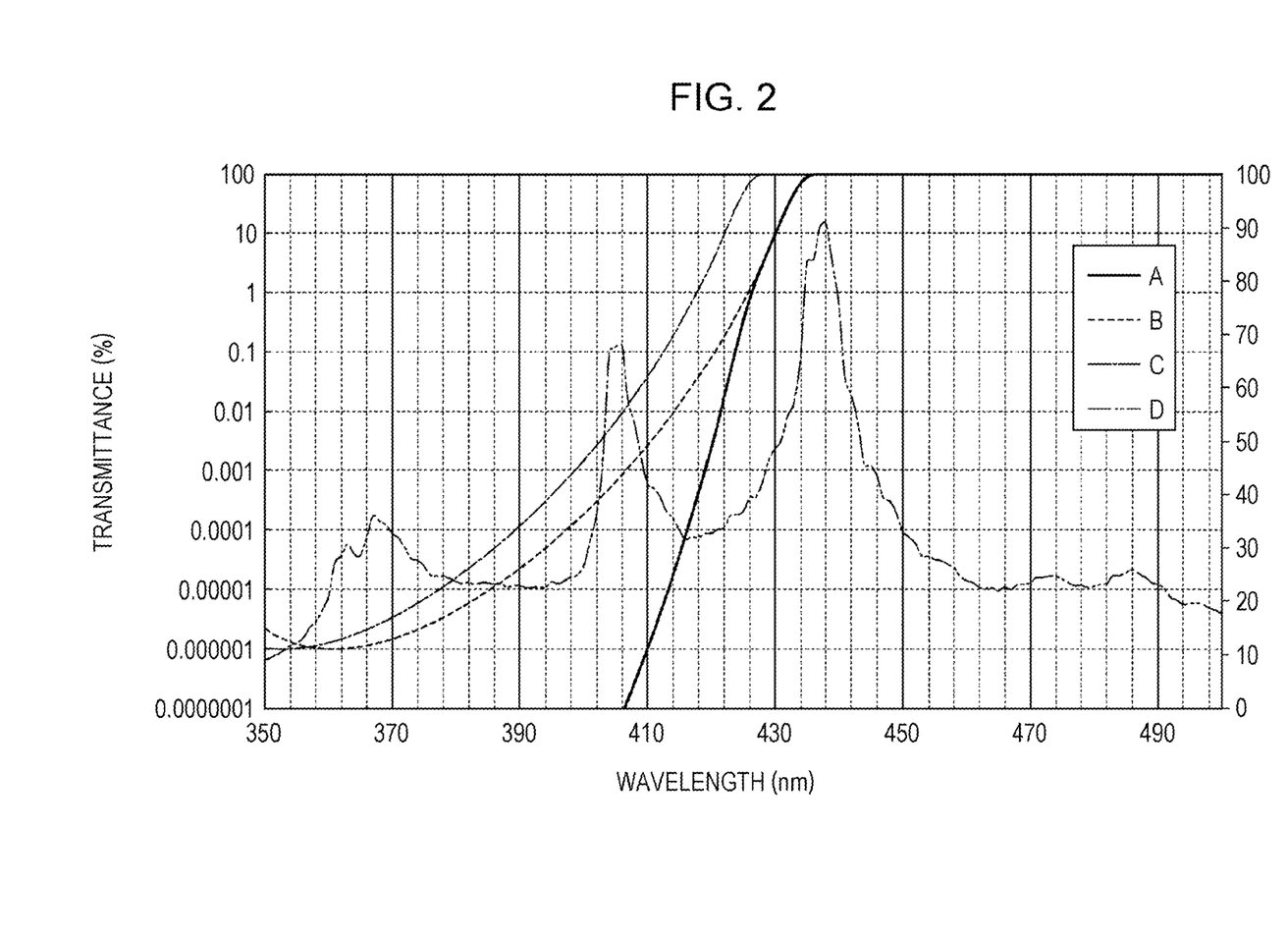
FIG. 2 is a diagram illustrating the transmittance characteristic of an ultraviolet cut member according to the first embodiment.

FIG. 2 is a drawing illustrating the transmittance characteristic of the ultraviolet cut member 6. In FIG. 2, the transmittance of the ultraviolet cut member 6 is represented by a solid line A, and, for comparison, the transmittance characteristic of the first filter 32 alone is represented by a broken line B, and the transmittance characteristic of the second filter 33 alone is represented by a dot-dash line C. Moreover, in FIG. 2, the spectrum of the lamp of the light source 2 is represented by a two dot-dash line D. Moreover, in FIG. 2, the horizontal axis represents wavelength (units; nm) and the vertical axis represents transmittance (units; %).

As illustrated in FIG. 2, the half-value wavelengths of the first filter 32 and the second filter 33 are 8 nm apart from each other. That is, the wavelengths of the ultraviolet components that are cut by the first filter 32 and the second filter 33 (below, sometimes also called cut wavelength) are only 8 nm apart from each other.

Moreover, as illustrated in FIG. 2, it can be confirmed that the ultraviolet cut member 6, which has light blocking performance due to a combination of the first filter 32 and the second filter 33, can reliably cut ultraviolet components near 410 nm which cause damage to the liquid crystal light valves that are arranged downstream of the ultraviolet cut member 6. Moreover, it can be confirmed that the ultraviolet cut member 6 has, compared with each of the first filter 32 and the second filter 33, a steep cut-off characteristic.

In the ultraviolet cut member 6 of this embodiment, the above described wavelength gap width was 8 nm, however, the wavelength gap width is not limited to this. The inventors of the present invention, as a result of diligent study, have found that a desirable cut-off characteristic (steepness) cannot be obtained when the cut wavelength gap width is smaller than 3 nm, and that when the gap width is larger than 20 nm, the blocking performance for an ultraviolet component near 410 nm decreases. On the basis of this knowledge, it was found that, in the ultraviolet cut member 6, it is possible to obtain a good cut-off characteristic by setting the cut wavelength gap width that occurs at the two filters to be 3 nm to 20 nm.

From the above, because the ultraviolet cut member 6 of this embodiment has a high light blocking performance and cut-off characteristic, a light component having a wavelength near 410 nm, which easily damages the liquid crystal light valve 24, can be cut from light of the light source 2 serving as image light.

Returning to FIG. 1, although not illustrated in detail, the polarization conversion element 5 is formed of a polarization beam splitter array (PBS array) arranged on the ultraviolet cut member 6 side, and a ½ wavelength plate array arranged on the dichroic mirror 13 side. The polarization conversion element 5 splits, through the PBS array, light emitted by the light source 2 depending on the polarization direction of the light. Moreover, the polarization conversion element 5 converts, through the ½ wavelength array, the polarization direction of one linearly polarized light to the polarization direction of the other linearly polarized light, and orients the light in a particular polarization direction.

In this embodiment, the polarization direction of light emitted from the polarization conversion element 5 and the polarization direction of the light-incident-side polarizing plate of each of the liquid crystal light valves 22 and 23 are the same. For example, the polarization direction of light emitted through the polarization conversion element 5 and the polarization direction of the light-incident-side polarizing plate of each of the liquid crystal light valves are both directions perpendicular to the page surface of FIG. 1.

The structure located downstream of the light source device 1 is described below together with the function of each component. Light emitted by the light source device 1 is incident on the dichroic mirror 13. The dichroic mirror 13 has a characteristic of transmitting red light LR and reflecting blue light LB and green light LG among light emitted by the light source 2. The red light LR transmitted by the dichroic mirror 13 is reflected by the reflecting mirror 17 and is incident on the liquid crystal light valve 22 for red light.

The dichroic mirror 14 has a characteristic of transmitting blue light LB and reflecting green light LG among light reflected by the dichroic mirror 13. Consequently, among color light reflected by the dichroic mirror 13, green light LG is reflected by the dichroic mirror 14 and is incident on the liquid crystal light valve 23 for green light. However, blue light LB is transmitted by the dichroic mirror 14 and is incident on the liquid crystal light valve 24 for blue light via a relay optical system 21 formed of a relay lens 18, the reflecting mirror 15, a relay lens 19, the reflecting mirror 16, and a relay lens 20.

An image signal that has been input into the projector 30 as an analog signal, after being converted into an analog signal again by a DA converter, is supplied to each of the liquid crystal light valves 22, 23, and 24 via a liquid crystal light valve driver.

In this embodiment, because an ultraviolet component, which is a source of damage, is cut from light emitted by the light source device 1, the liquid crystal light valve 24 can be prevented from receiving damage.

Moreover, in the ultraviolet cut member 6 of the light source device 1, a particular ultraviolet component can be reliably cut in the above described manner by the second filter 33 which, after an ultraviolet component has been mainly cut from light from the light source 2 by the first filter 32 having a long cut wavelength, further cuts the remaining ultraviolet part in stages. Therefore, generation of stray light or scattered light from inside the projector 30 due to an ultraviolet component transmitted by the ultraviolet cut member 6 is suppressed.

Moreover, because the ultraviolet cut member 6 has a good cut-off characteristic (steepness), the boundary between the reflection wavelength and the transmission wavelength is distinct, and this makes it possible to extract light that contains only a certain wavelength component as image light. Therefore, it is possible to display a high-quality image.

The liquid crystal light valves 22, 23, and 24 each, although not illustrated, include a liquid crystal panel having a liquid crystal layer sandwiched between a pair of glass substrates, an incident-side polarizing plate arranged on the light incident side of the liquid crystal panel, and an emission-side polarizing plate arranged on the light emission side of the liquid crystal panel. The liquid crystal layer mode may be a TN mode, a VA mode, a horizontal electric field mode or the like and is not particularly limited. The liquid crystal light valves 22, 23, and 24 each include a polarizing plate on their light incident side and light emission side.

Moreover, the incident-side polarizing plates are preferably arranged in the light paths among the liquid crystal light valves 22, 23, and 24, and a configuration in which two or three of the liquid crystal light valves 22, 23, and 24 share one incident-side polarizing plate is also possible. Further, the incident-side polarizing plate may be formed of a plurality of polarizing plates. Moreover, an emission-side polarizing plate may be provided on the light emission side of the cross dichroic prism 25, and a configuration in which the liquid crystal light valves 22, 23, and 24 share one emission-side polarizing plate is also possible.

The three color light beams respectively modulated by the liquid crystal light valves 22, 23, and 24 are incident on the cross dichroic prism 25. The cross dichroic prism 25 has a structure in which four right-angled prisms are bonded to each other. At the opposing faces of the four right-angled prisms, a dielectric multilayer film that reflects red light and transmits color light other than red light, and another dielectric multilayer film that reflects blue light and transmits color light other than blue light are formed in an X shape. Through these dielectric multilayer films, three color light beams are combined and light exhibiting a color image is formed. The combined light beams are magnified and projected on a screen 27 by the projection lens 26 and an image is displayed.

As described above, according to this embodiment, because it is possible to obtain image light containing only a particular wavelength component while cutting an ultraviolet component, which can damage liquid crystal light valves and the like, among light from the light source 2, it is possible to provide a highly reliable projector 30 that can display a high-quality image while suppressing damage caused by ultraviolet rays.

Second Embodiment

Figure 3:
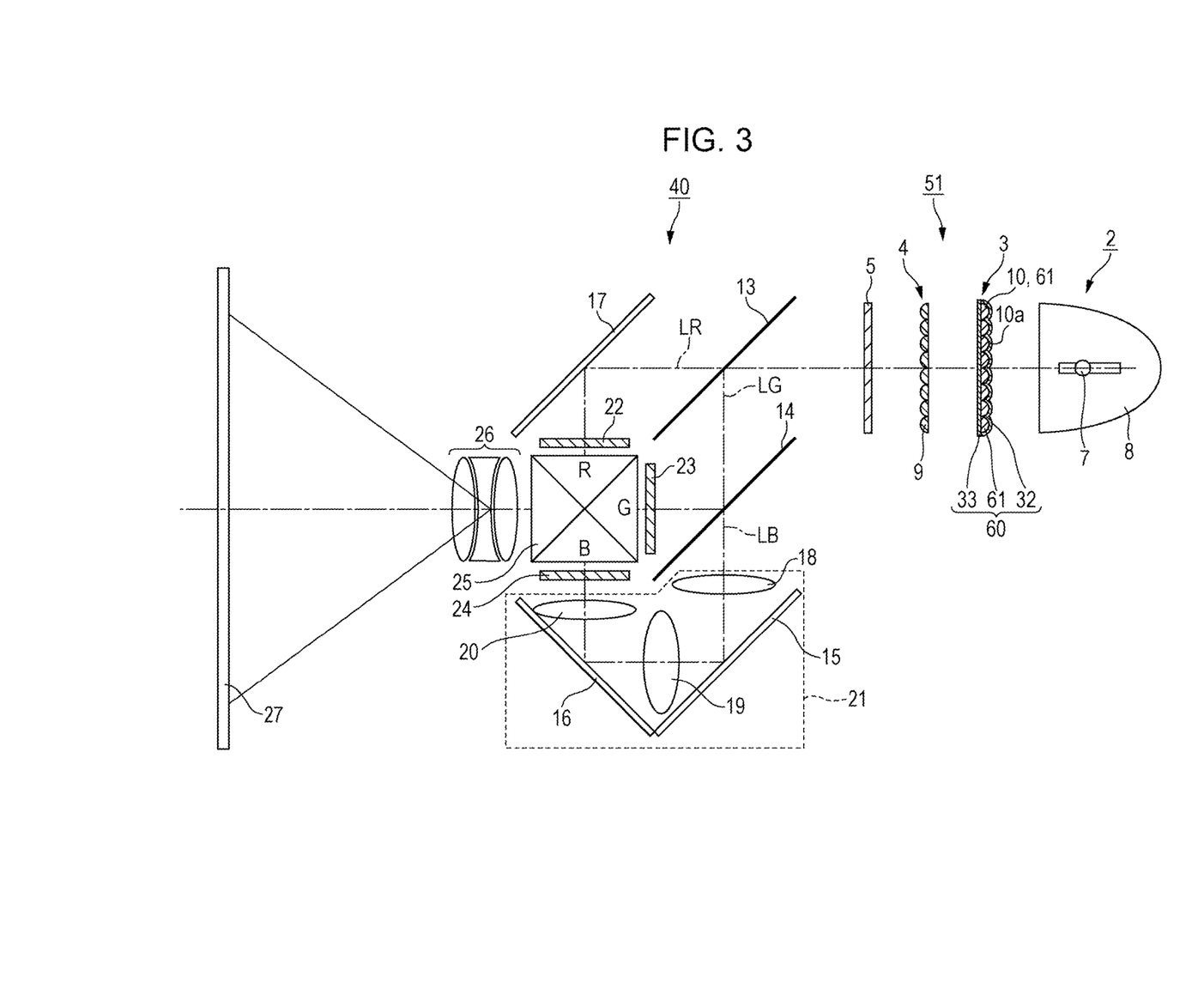
FIG. 3 is a schematic block diagram of a projector according to a second embodiment.

Next, a projector 40 illustrated in FIG. 3 will be described as a second embodiment. Moreover, FIG. 3 is a schematic block diagram of the projector 40 of the second embodiment. The second embodiment and the first embodiment differ in terms of the structure of the light source device; however, all other structures are the same. Consequently, in the description below, regarding elements equivalent to those of the projector 30 illustrated in FIG. 1, description thereof is omitted and the same reference numerals as in the drawing will be assigned thereto.

As illustrated in FIG. 3, the projector 40 includes a light source device 51, the dichroic mirrors 13 and 14, the reflecting mirrors 15, 16, and 17, the liquid crystal light valves 22, 23, and 24, the cross dichroic prism 25, and the projection lens 26.

The light source device 51 includes the light source 2, the first fly-eye lens 3 and the second fly-eye lens 4, the polarization conversion element 5, and an ultraviolet cut member 60. The ultraviolet cut member 60 of this embodiment includes a light transmissive substrate 61, the first filter 32 arranged on the light source 2 side of the light transmissive substrate 61, and the second filter 33 arranged on the second fly-eye lens 4 side of the light transmissive substrate 61.

In this embodiment, the ultraviolet cut member 60 has the first fly-eye lens 3 as the light transmissive substrate 61. In this embodiment, the plurality of the lenses (lens members) 10 forming the first fly-eye lens 3 each have a curved surface 10a that is convex toward the light source 2 side.

Figure 4:
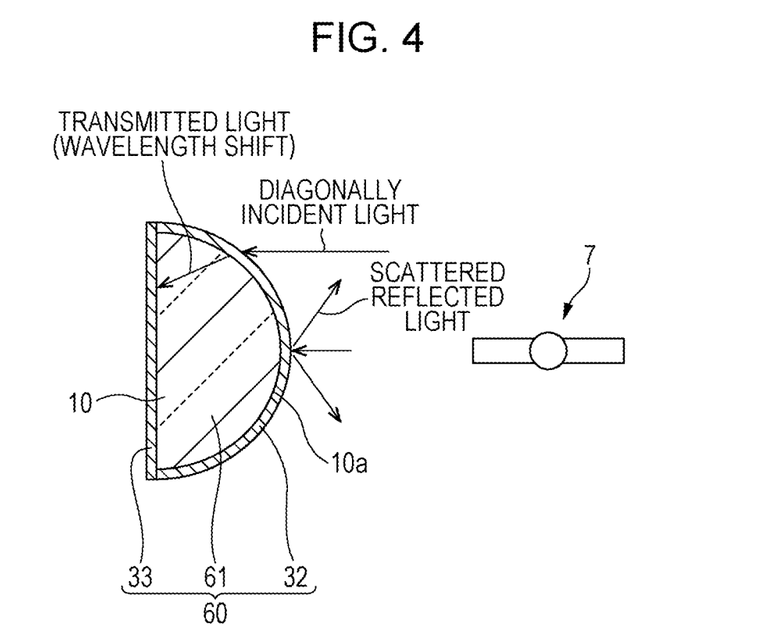
FIG. 4 is a diagram illustrating the structure of a principal part of an ultraviolet cut member according to the second embodiment.

FIG. 4 is a diagram illustrating the structure of the principal part of the ultraviolet cut member 60. As illustrated in FIG. 4, the first filter 32 is arranged on the curved surface 10a of the lens 10. However, the second filter 33 is arranged on a flat surface opposite the curved surface 10a of the lens 10. That is, the first filter 32 itself also has a surface shape that is curved because it follows the shape of the curved surface 10a.

A part of the light of the light source 2 is reflected by the first filter 32. There is a concern that the temperature of the lamp 7 will rise due to a substantial amount of light reflected by the first filter 32 returning to the lamp 7 of the light source 2. Moreover, there is a concern that the lifetime of the light source 2 will shorten with the continued deterioration of the lamp 7 caused by the light reflected by the first filter 32.

However, in this embodiment, because the first filter 32 has a curved surface shape, light from the light source 2 diverges when reflected by the first filter 32 having a curved surface that follows the curved surface 10a of the lens 10.

Therefore, because light is reflected in various directions, it is possible to suppress light from being directly incident on the light source 2, and it is possible to suppress a rise in the temperature of the light source 2 due to reflected light or the accompanying decrease in lifetime due to deterioration caused by ultraviolet ray absorption.

Here, generally, in ultraviolet cut filters, there is a characteristic that a cut wavelength shifts to the short wavelength side when light rays are diagonally incident on the film surface. In this embodiment, because the shape of the surface of the first filter 32 at which light from the light source 2 is incident has a curved surface, a part of the light from the light source 2 is diagonally incident on the surface of the first filter 32.

Because the wavelength of the light diagonally incident on the first filter 32 shifts to the short wavelength side, it deviates outside the cut wavelength region of the first filter 32 and is transmitted rearwards by the first filter 32 rather than being reflected by the first filter 32.

However, according to this embodiment, it is possible to cut (reflect) the component that has been shifted to the short wavelength side by using the second filter 33 that has a cut wavelength shorter than the first filter 32. Therefore, because the projector 40 of this embodiment includes the ultraviolet cut member 60, as in the first embodiment, it is possible to display a high-quality image while suppressing damage caused by ultraviolet rays. Further, the ultraviolet cut member 60 is capable of suppressing a decrease in the lifetime of the light source 2 caused by reflected light (ultraviolet rays).

Although an embodiment of this invention is described above, the invention is not limited to the above-described content and may be modified appropriately as long as it does not deviate from the scope of the invention.

The entire disclosure of Japanese Patent Application No. 2014-205490, filed Oct. 6, 2014 is expressly incorporated by reference herein.

What is claimed is:

1. A light source device comprising:
   a light source that emits light including light having a wavelength in an ultraviolet region,
   a first filter that reflects light of a particular wavelength region of the ultraviolet region among light from the light source and that transmits light of another wavelength region,
   a second filter that is arranged on a side of the first filter opposite to that on which the light source is arranged, and that removes light of a wavelength region that is different from the particular wavelength region of the ultraviolet region among the light transmitted by the first filter, and
   a lens member that is arranged between the first filter and the second filter, the lens member has a plurality of lens convex surfaces forming a plurality of lenses protruding toward the light source and a flat surface that faces in a direction opposite to the plurality of lens convex surfaces,
   wherein
      the second filter has a half-value wavelength that is shorter than a half-value wavelength of the first filter,
      the first filter is formed on each of the plurality of lens convex surfaces of the lens member such that the first filter includes a plurality of filter convex surfaces protruding toward the light source,
      the second filter is arranged on the flat surface of the lens member,
      at least a portion of the first filter formed on the plurality of convex surfaces of the lens member is in contact with at least a portion of the second filter arranged on the flat surface of the lens member, and
      the first filter and the second filter together surround an outer perimeter of the lens member.

2. The light source device according to claim 1, wherein the half-value wavelength of the second filter is 3 nm to 20 nm shorter than the half-value wavelength of the first filter.

3. The light source device according to claim 1, wherein the first filter and the second filter are each formed of a dielectric multilayer film made up of alternately stacked high-refractive-index layers and low-refractive-index layers.

4. The light source device according to claim 3, wherein the high-refractive-index layers each include $TiO_2$, $Ta_2O_5$, or $Nb_2O_5$, and the low-refractive-index layers each include $SiO_2$ or $MgF_2$.

5. The light source device according to claim 1, wherein the light source is an ultra-high-pressure mercury lamp.

6. A projector comprising:
   the light source device according to claim 1,
   an optical modulator that modulates light from the light source device in accordance with image information and emits light, and
   a projection optical system that projects light emitted from the optical modulator.

* * * * *